US 7,788,084 B2

(12) United States Patent
Brun et al.

(10) Patent No.: US 7,788,084 B2
(45) Date of Patent: Aug. 31, 2010

(54) LABELING OF WORK OF ART TITLES IN TEXT FOR NATURAL LANGUAGE PROCESSING

(75) Inventors: Caroline Brun, Grenoble (FR); Caroline Hagège, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1016 days.

(21) Appl. No.: 11/524,230

(22) Filed: Sep. 19, 2006

(65) Prior Publication Data

US 2008/0071519 A1  Mar. 20, 2008

(51) Int. Cl.
G06F 17/28 (2006.01)
(52) U.S. Cl. .................................. 704/7; 704/8; 704/9
(58) Field of Classification Search ............... 704/7–10; 707/3–6
See application file for complete search history.

(56) References Cited

U.S. PATENT DOCUMENTS

| | | | | |
|---|---|---|---|---|
| 4,965,763 A * | 10/1990 | Zamora | ................... | 704/1 |
| 5,500,920 A * | 3/1996 | Kupiec | ................... | 704/270.1 |
| 5,519,608 A * | 5/1996 | Kupiec | ................... | 704/9 |
| 5,696,962 A * | 12/1997 | Kupiec | ................... | 707/4 |
| 5,819,265 A * | 10/1998 | Ravin et al. | ................... | 707/5 |
| 5,845,306 A * | 12/1998 | Schabes et al. | ................... | 715/209 |
| 6,263,335 B1 | 7/2001 | Paik et al. | | |
| 6,405,162 B1 | 6/2002 | Segond et al. | | |
| 6,411,962 B1 * | 6/2002 | Kupiec | ................... | 707/102 |
| 6,678,677 B2 | 1/2004 | Roux et al. | | |
| 6,973,429 B2 * | 12/2005 | Smith | ................... | 704/257 |
| 7,058,567 B2 | 6/2006 | Aït-Mokhtar et al. | | |
| 2002/0069059 A1 * | 6/2002 | Smith | ................... | 704/257 |
| 2005/0137847 A1 | 6/2005 | Brun et al. | | |
| 2005/0138000 A1 | 6/2005 | Roux et al. | | |
| 2005/0138556 A1 | 6/2005 | Brun et al. | | |
| 2006/0123448 A1 * | 6/2006 | Ma et al. | ................... | 725/51 |
| 2006/0271887 A1 * | 11/2006 | Bier et al. | ................... | 715/866 |

OTHER PUBLICATIONS

U.S. Appl. No. 11/013,366, filed Dec. 15, 2004, Brun, et al.
U.S. Appl. No. 11/018,758, filed Dec. 21, 2004, Brun, et al.
U.S. Appl. No. 11/018,892, filed Dec. 21, 2004, Brun, et al.
U.S. Appl. No. 11/173,136, filed Dec. 20, 2004, Sàndor, et al.
U.S. Appl. No. 11/173,680, filed Dec. 20, 2004, Sàndor, et al.
U.S. Appl. No. 11/202,549, filed Aug. 12, 2005, Brun.
U.S. Appl. No. 11/287,170, filed Nov. 23, 2005, Brun, et al.

(Continued)

Primary Examiner—Leonard Saint Cyr
(74) Attorney, Agent, or Firm—Fay Sharpe LLP

(57) ABSTRACT

A parser for parsing text includes a tokenizing module which divides the text into an ordered sequence of linguistic tokens. A morphological module associates parts of speech with the linguistic tokens. A detection module identifies candidate titles of creative works, such as works of art. A filtering module filters the candidate titles of works to exclude citations of direct speech from the candidate titles of works. A comparison module compares any remaining candidate titles of works with titles of works in an associated knowledge base. The comparison module annotates the text when a match is found.

18 Claims, 2 Drawing Sheets

OTHER PUBLICATIONS

U.S. Appl. No. 11/341,788, filed Jan. 27, 2006, Segond, et al.
U.S. Appl. No. 11/354,688, filed Feb. 15, 2006, Roulland, et al.
Aït-Mokhtar, et al., Incremental Finite-State Parsing, *Proceedings of Applied Natural Language Processing*, Washington, Apr. 1997.
Aït-Mokhtar, et al., Subject and Object Dependency Extraction Using Finite-State Transducers, *Proceedings ACL'97 Workshop on Information Extraction and the Building of Lexical Semantic Resources for NLP Applications*, Madrid, Jul. 1997.
Aït-Mokhtar, et al., Robustness Beyond Shallowness: Incremental Dependency Parsing, *NLE Journal*, 2002.
Aït-Mokhtar, et al., A Multi-Input Dual-Entry Point Dependency Parser, *Proceedings of Beijing*, IWPT, 2001.
Y.Nii, K.Kawata, T.Yoshida, H.Sakai, S.Masuyama, Question Answering System QUARK, *Working Notes of NTCIR-4*, Tokyo, Jun. 2-4, 2004.
B.Galitsky, Use of Default Reasoning for Disambiguation Under Question Answering, *School of Computer Science and Information Systems*, 2004.
D.Laurent, P.Séguéla, S.Nègre, Cross Lingual Question Answering Using QRISTAL for CLEF 2005, *CLEF 2005*, Wien, Sep. 21-23, 2005.

* cited by examiner

LABELING OF WORK OF ART TITLES IN TEXT FOR NATURAL LANGUAGE PROCESSING

CROSS REFERENCE TO RELATED PATENTS AND APPLICATIONS

The following copending applications, the disclosures of which are incorporated in their entireties by reference, are mentioned:

application Ser. No. 11/013,366, filed Dec. 15, 2004, entitled SMART STRING REPLACEMENT, by Caroline Brun, et al.;

application Ser. No. 11/018,892, filed Dec. 21, 2004, published Jun. 22, 2006, as Published Application No. 20060136196, entitled BI-DIMENSIONAL REWRITING RULES FOR NATURAL LANGUAGE PROCESSING, by Caroline Brun, et al.;

application Ser. No. 11/202,549, filed Aug. 12, 2005, entitled DOCUMENT ANONYMIZATION APPARATUS AND METHOD, by Caroline Brun;

application Ser. No. 11/287,170, filed Nov. 23, 2005, entitled CONTENT-BASED DYNAMIC EMAIL PRIORITIZER, by Caroline Brun, et al.;

application Ser. No. 11/341,788, filed Jan. 27, 2006, entitled LINGUISTIC USER INTERFACE, by Frederique Segond, et al.

application Ser. No. 11/354,688, filed Feb. 15, 2006, entitled NATURAL LANGUAGE PROCESSING FOR DEVELOPING QUERIES, by Frederic Roulland, et al.;

application Ser. No. 11/173,136, filed Dec. 20, 2004, entitled CONCEPT MATCHING, by Agnes Sándor, et al.;

application Ser. No. 11/173,680, filed Dec. 20, 2004, entitled CONCEPT MATCHING SYSTEM, by Agnes Sándor, et al.; and application Ser. No. 11/018,758, filed Dec. 21, 2004, Published Application No. 2006-0136223, entitled BILINGUAL AUTHORING ASSISTANT FOR THE 'TIP OF THE TONGUE' PROBLEM, by Caroline Brun, et al.

BACKGROUND

The exemplary embodiment relates to the linguistic arts. It finds particular application in conjunction with automated natural language processing for use in diverse applications such as information extraction and retrieval, grammar checkers for word processors, document content analyzers, and so forth, and will be described with particular reference thereto. However, it is to be appreciated that the exemplary embodiment is also amenable to other like applications.

Information retrieval tools are widely known which select text passages matching user criteria according to key words input by the user. These tools typically retrieve all available text passages that contain the key words. To improve retrieval of responsive text, natural language processing (NLP) systems have been developed which identify grammatical relationships (syntactic dependencies) between words or phrases in the text. The grammatical relationships are computed by first identifying the parts of speech associated with each word of a sentence. Some words may be associated with two or more parts of speech. For example, "fly" can be a noun or a verb or may form a part of a compound noun, such as "fly wheel." By applying disambiguation rules, the most likely part of speech can be associated with the word, based on its context. Once the parts of speech are identified, grammatical relationships between the words and between groups of words are computed.

When titles of works of art, such as titles of books, movies, plays, and paintings, appear in natural language text, the computed parts of speech often yield inappropriate grammatical relationships. This is because the expressions used to identify the titles of works of art tends to disturb the syntactic order of sentences. As a result, the accuracy of NLP tools can be degraded. For example, consider the sentence: The album featured the singles "Girls Keep Singing", "DJ" and "Look Back". Natural language processing of this sentence may identify Girls, Singing, and DJ, respectively as noun, verb, and adjective and create a dependency between Keep and DJ in which DJ is identified as the object of the verb Keep. Clearly, this analysis is inappropriate, because the chunking of Singing, DJ and Look, coordinated noun phrases is wrong.

INCORPORATION BY REFERENCE

The following references, the disclosures of which are incorporated herein by reference in their entireties, are mentioned:

U.S. Pat. No. 6,405,162, entitled TYPE-BASED SELECTION OF RULES FOR SEMANTICALLY DISAMBIGUATING WORDS, by Segond, et al., discloses a method of semantically disambiguating words using rules derived from two or more types of information in a corpus which are applicable to words occurring in specified contexts. The method includes obtaining context information about a context in which a semantically ambiguous word occurs in an input text and applying the appropriate rule.

U.S. Pat. No. 6,678,677, entitled APPARATUS AND METHOD FOR INFORMATION RETRIEVAL USING SELF-APPENDING SEMANTIC LATTICE, by Roux, et al., discloses a method for information retrieval using a semantic lattice.

U.S. Published Application No. 20050138556, entitled CREATION OF NORMALIZED SUMMARIES USING COMMON DOMAIN MODELS FOR INPUT TEXT ANALYSIS AND OUTPUT TEXT GENERATION, by Brun, et al., discloses a method for generating a reduced body of text from an input text by establishing a domain model of the input text, associating at least one linguistic resource with the domain model, analyzing the input text on the basis of the at least one linguistic resource, and based on a result of the analysis of the input text, generating the body of text on the basis of the at least one linguistic resource.

U.S. Pat. No. 6,263,335, entitled INFORMATION EXTRACTION SYSTEM AND METHOD USING CONCEPT-RELATION-CONCEPT (CRC) TRIPLES, by Paik, et al., discloses a system which identifies a predetermined set of relationships involving named entities.

U.S. Pat. No. 7,058,567, issued Jun. 6, 2006, Published Application No. 20030074187, entitled NATURAL LANGUAGE PARSER, by Aït-Mokhtar, et al., discloses a parser for syntactically analyzing an input string. The parser applies a plurality of rules which describe syntactic properties of the language of the input string.

U.S. Published Application No. 20050138000, entitled SYSTEMS AND METHODS FOR INDEXING EACH LEVEL OF THE INNER STRUCTURE OF A STRING OVER A LANGUAGE HAVING A VOCABULARY AND A GRAMMAR, by Roux, et al., discloses methods for indexing and searching the inner structure of a string over a language having a vocabulary and a grammar using bit vectors.

U.S. Published Application No. 20050137847, entitled METHOD AND APPARATUS FOR LANGUAGE LEARNING VIA CONTROLLED TEXT AUTHORING, by Brun, et al., discloses a method for testing a language learner's ability to create semantically coherent grammatical text in a language which includes displaying text in a graphical user interface, selecting from a menu of linguistic choices comprising at least one grammatically correct linguistic choice and at least one grammatically incorrect linguistic choice, and displaying an error message when a grammatically incorrect linguistic choice is selected.

BRIEF DESCRIPTION

Aspects of the exemplary embodiment include a parser, a natural language processing system, a method for processing text, and a storage medium which encodes instructions for processing text.

In accordance with one aspect of the exemplary embodiment, a parser for parsing text includes a tokenizing module which divides the text into an ordered sequence of linguistic tokens, a morphological module for associating parts of speech with the linguistic tokens, a detection module which applies rules for identifying expressions as candidate titles of works, each of the expressions comprising at least one of the linguistic tokens, a filtering module for filtering the candidate titles of works, the filtering module applying at least one rule which is formulated to exclude citations of direct speech from the candidate titles of works, and a comparison module for comparing remaining candidate titles of works with titles of works in an associated knowledge base and annotating the text to identify the candidate title as a nominative unit when a match with a title of a work is found in the associated knowledge base.

In another aspect, a method for natural language processing of input text includes processing the text to identify candidate titles of works, filtering the candidate titles of works, including applying at least one rule which is formulated to remove citations of direct speech from the candidate titles of works, comparing remaining candidate titles of works with a knowledge base which identifies titles of works and, for a candidate title of a work which matches a title of a work in the knowledge base, annotating the text to identify the candidate title of a work as a nominative unit.

In another aspect, a storage medium includes instructions which, when executed by a digital processor, implement natural language processing of a text input including processing the text to identify candidate titles of works, filtering the candidate titles of works to remove citations of direct speech from the candidate titles of works, comparing candidate titles of works with a knowledge base which identifies titles of works, and annotating text that includes a candidate title of a work for which a match is found in the knowledge base.

DETAILED DESCRIPTION

Figure 1:
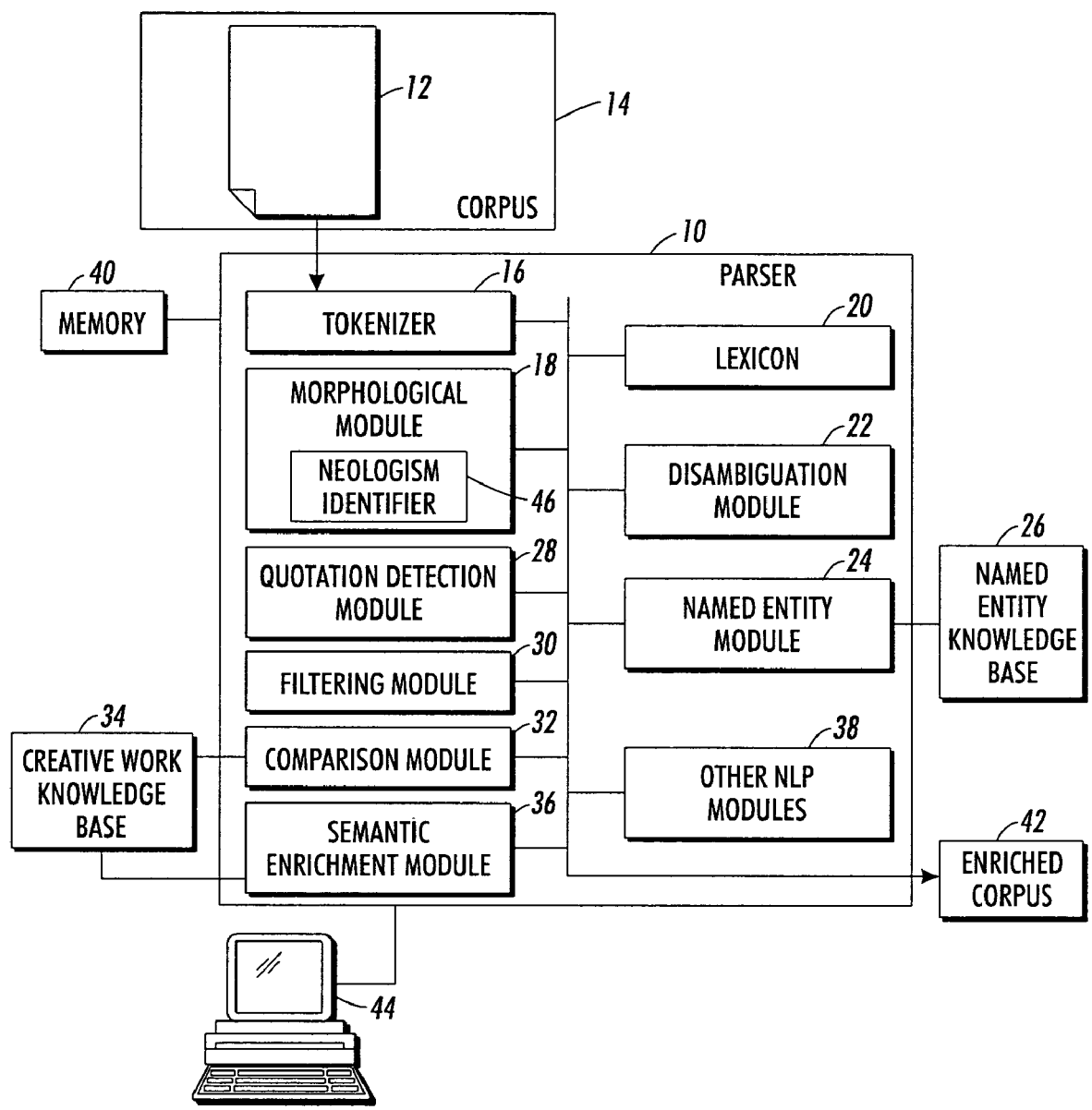
FIG. 1 is a functional block diagram of a natural language processing system in accordance with one aspect of the exemplary embodiment.

In aspects of the exemplary embodiment, a natural language processing system and method suitable for use in processing of natural language text are provided. The system identifies expressions which may refer to works of art in text, applies rules for filtering out expressions which do not refer to works of art, and annotates each of the remaining expressions with a tag which identifies the expressions as a nominal unit. Once detected, they can be treated as nouns while further syntactic analysis is performed on the text. While the exemplary embodiment is directed to identifying and labeling work of art titles, it is to be appreciated that other creative work titles are also contemplated.

The exemplary natural language processing system finds application in association with NLP tools, such as syntactic and semantic analyzers, rendering them more efficient for information extraction applications. In one aspect, the nominal unit is further enriched with a semantic categorization. This is particularly useful for information extraction applications.

As used herein "works of art" can comprise audio and/or visual works of art in tangible or intangible media, including, books, films, plays, music, voice recordings, paintings, photographs, sculptures, and the like with which a title is associated as a means for identifying the work of art.

A "title of a work" refers generally to a text string that includes one or more words and optionally includes punctuation, which identifies a creative work, including works of art and other creative works, such as scholarly articles.

"Nominal units," as used herein generally encompasses nouns and noun phrases. A nominal unit may thus comprise one or more words which serve as the noun in a syntactic dependency, e.g., as the subject or object of an associated verb.

"Quotation expressions," as used herein include expressions which are distinguished from surrounding text by quotation marks (" ") or other emphasis of the type commonly used to distinguish work of art titles, such as underlining and/or italicizing but which may also be used to introduce discourse and for other types of emphasis.

Expressions designating titles of works of art and other creative work titles can be very heterogeneous in their syntactic form. For example the following is a list of book titles:

After the Funeral—Agatha Christie
Chocolat—Joanne Harris (1999)
Les Confessions—Jean-Jacques Rousseau
I, the Jury—Mickey Spillane (1947)
I'll Go to Bed at Noon—Gerard Woodward (2004)

As exemplified in these titles, titles of works of art can include a wide variety of syntactic units, such as nouns, prepositional phrases, noun phrases, complete sentences, foreign expressions, and the like. In the context of running texts, however, the titles behave as nouns and as such can be considered named entities of a particular type.

In many respects, however, titles have similarities with expressions which are not descriptions of works of art and thus present a high potential for ambiguity. For example, Yesterday is a song title, but the word is more widely used in other contexts. In general, it has not proved feasible or beneficial to store work of art titles as single or multiword nominal units in a dictionary used for syntactic analysis due to the other contextual uses, particularly when a deterministic parser is used for the linguistic analysis.

The exemplary embodiment reduces the ambiguity of quotation expressions by first using context to identify potential title expressions, and then matching these expressions against a knowledge source.

In one embodiment, the system includes a syntactic parser that analyses running text. The parser has access to an encyclopedic knowledge base. For example, the knowledge base comprises one or more web-based databases accessible to the parser during the parsing process or a local database which includes information retrieved from such a database.

With reference to FIG. 1, a natural language processing system includes a parser 10 that receives a natural language text 12, such as a paragraph, sentence, a portion of a sentence, or a multiple-word text fragment written in French, English, or another natural language. The input text may form a portion of a body of text (a corpus) 14. In general, the parser 10 takes as input a text document or extended mark up language (XML) document, or group of documents and applies a set of rules, called a grammar, dedicated to a particular natural language such as French, English, or Japanese. A grammar is written in a formal rule language, and describes the word or phrase configurations that the parser 10 tries to recognize. The basic rule set used to parse basic documents in French, English, or Japanese is called the "core grammar." Additional rules may be appended and launched along with the basis set of rules.

In some embodiments, the parser 10 comprises an incremental parser, such as the Xerox Incremental Parser (XIP), as described, for example, in above-referenced U.S. Patent Publication No. 20050138556 and U.S. Pat. No. 7,058,567, incorporated herein by reference, and in the following references: Aït-Mokhtar, et al., "Incremental Finite-State Parsing," Proceedings of Applied Natural Language Processing, Washington, April 1997; Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997; Aït-Mokhtar, et al., "Robustness Beyond Shallowness: Incremental Dependency Parsing," NLE Journal, 2002; and Aït-Mokhtar, et al., "A Multi-Input Dependency Parser," in Proceedings of Beijing, IWPT 2001.

The parser 10 may include several modules for linguistic analysis. Each module works on the input text, and in some cases, uses the annotations generated by one of the other modules, and the results of all the modules are used to annotate the text. Thus, several different grammar rules may eventually be applied to the same sentences or fragments (such as words, phrases) thereof. In general, the rules are applied on sentences of text. Since the modules are primarily in the form of software, it will be appreciated that fewer or more modules may be provided than those illustrated.

The illustrated parser 10 includes a tokenizing module 16 that breaks the natural language text 12 down into an ordered sequence of tokens. For example, in a suitable approach, each word bounded by spaces and/or punctuation is defined as a single token, and each punctuation mark is defined as a single token. A morphological module 18 performs morphological analysis and annotates each token with a part of speech. The morphological module associates features from a list of features, such as indefinite article, noun, verb, etc., with each recognized word, punctuation mark, or other text fragment in the document. This module 18 may thus attach tags to a word which identify the grammatical role of the word in the sentence and identify punctuation, including quotation marks. The morphological analysis may be performed with finite-state transducers, referred to as lexicons 20. The lexicon is an automaton which takes as input a token and yields the possible interpretations of that token. The lexicon stores thousands of tokens together with their word forms in a very compact and efficient way.

A disambiguation module 22 disambiguating words having more than one meaning. Disambiguation may consist of pruning the non-relevant categories for ambiguous words, as described, for example, in U.S. Pat. No. 6,405,162, incorporated herein by reference in its entirety. Disambiguation may include rule-based and/or statistical methods, such as the Hidden Markov Model (HMM), which has been trained on large corpora. The result of this training is stored in a specific file which comprises hundreds of sequence of two of three categories, for which disambiguation is provided. The disambiguation module may thus identify the most appropriate part of speech for a word and prune any tags added by the morphological module which are inconsistent with this.

In addition, some tokens may not be included in the lexicon 20. For example, the lexicon 20 cannot include a comprehensive and exhaustive list of the proper name of every person, place, business, or other named entity. A named entity extraction module 24 access a knowledge base 26 to obtain clues as to appropriate tags to attach to such named entities. The illustrated knowledge base 26 may be accessed by a wired or wireless network, such as the internet and may comprise one or more of an encyclopedia, an address list, an information bank, and/or other information source from which such information may be obtained. In particular, sources of information which are updated regularly to reflect current events, such as web-based encyclopedias, are useful sources of such information.

A quotation detection module 28 detects quotation expressions which represent candidate work of art titles. The detection module 28 applies rules for detection of a variety of expression formats which are often used in signaling a title such as quotation marks, and any emphasis associated with the words which sets the words apart from surrounding text, such as bold, italic, and/or underline.

A filtering module 30 processes the identified quotation expressions with the objective of filtering out those of the quotation expressions that do not correspond to work of art titles or titles of other creative works by applying a set of rules. The quotation expressions that are filtered out by the filtering module 30 can include one or more of citations of direct speech, neologisms or improper expressions, quotations included in person names, and nicknames. As will be appreciated with any natural language processing method, the effectiveness of this filtering depends on the construction of the rules. In general, the filtering does not guarantee that all non-creative work titles will be filtered from the quotation expressions or indeed that some quotation expressions which are actually works of art will not be filtered out.

A comparison module 32 compares the remaining quotation expressions which have not been filtered out by the filtering module with known titles of creative works, such as work of art titles, stored in a knowledge base 34, such as an encyclopedia, which is accessible to the parser. Matching quotation expressions in the text are tagged by the comparison module 32 as nominal units. The knowledge base 34 may be the same knowledge base as the knowledge base 26 or may be a separate knowledge base.

In addition to titles of works of art and/or other creative works, the knowledge base 34 may also store related information, such as creator, art category, and date for some or all of the titles. The categories may be broad categories, such as music, film, play, book, etc. or may comprise a more fined grained classification, such as music: popular or music: classical. Some of the titles may be associated in the knowledge base 34 with more than one work of art category, such as book and movie. The creator may be the name of a book's author or a performer of a music work of art. The date may be the issue date, publication date, or copyright date of the work of art. This information, which is standard encyclopedic knowledge, can be useful for semantic enrichment of the results of the text analysis. Exemplary knowledge sources for the knowledge base 34 include Wikipedia and other web-based knowledge sources which evolve constantly. In this way, the knowledge base reflects current news. In one embodiment, the knowledge base 34 is accessed via the Web. In another embodiment, the knowledge base 34 may comprise information extracted from a web-based knowledge source or other knowledge source which has been converted into a database, e.g., in a structured query language, such as that used in MySQL or an extended markup language (XML). The database 34 may include only such information which may be relevant to the present application. In this way, not necessarily all information available on the web is incorporated in the database 34, but rather extracts of it.

A semantic enrichment module 36 may further enrich the text with information based on information retrieved from the knowledge base 34 that is linked to the corresponding work of art title.

Additional modules 38 may provide deeper parsing of the text. For example, a chunking module applies a context free grammar defined by suitable rewriting rules. Each rewriting rule of the context free grammar defines a token pattern recognition rule matching an ordered sequence of linguistic tokens with a syntactical pattern, and thus associates a higher level constituent with an ordered sequence of lower level constituents defined by the ordered sequence of linguistic tokens, as described for example, in application Ser. No. 11/018,892, incorporated by reference.

A memory 40, accessible to the parser 10, stores input text during processing. The memory 40 may represent any type of computer readable medium such as magnetic disk or tape, a hard drive, optical disk, flash memory, or holographic memory. In one embodiment, the memory 40 comprises a combination of volatile memory, random access memory and read only memory.

The output of the parser may be an enriched corpus 42 in which each sentence in text is annotated with syntactic tags and in which at least some of the sentences containing quotation expressions matching those in the creative work knowledge base 34 are annotated with tags which class the expressions as nominal units and which may also be enriched with further information derived from the knowledge base 34.

The exemplary parser may be embodied in a computer system, such as a desktop, a laptop, palmtop computer, portable digital assistant (PDA), cellular telephone, pager, or other computing device with sufficient accessible memory and processing capability. In one embodiment, the computer system interacts with a user via a graphical user interface 44 such as a screen with a user input device such as a keyboard, cursor control device, or the like whereby a user may select text for processing and/or retrieve processed text which is responsive to a query.

Figure 2:
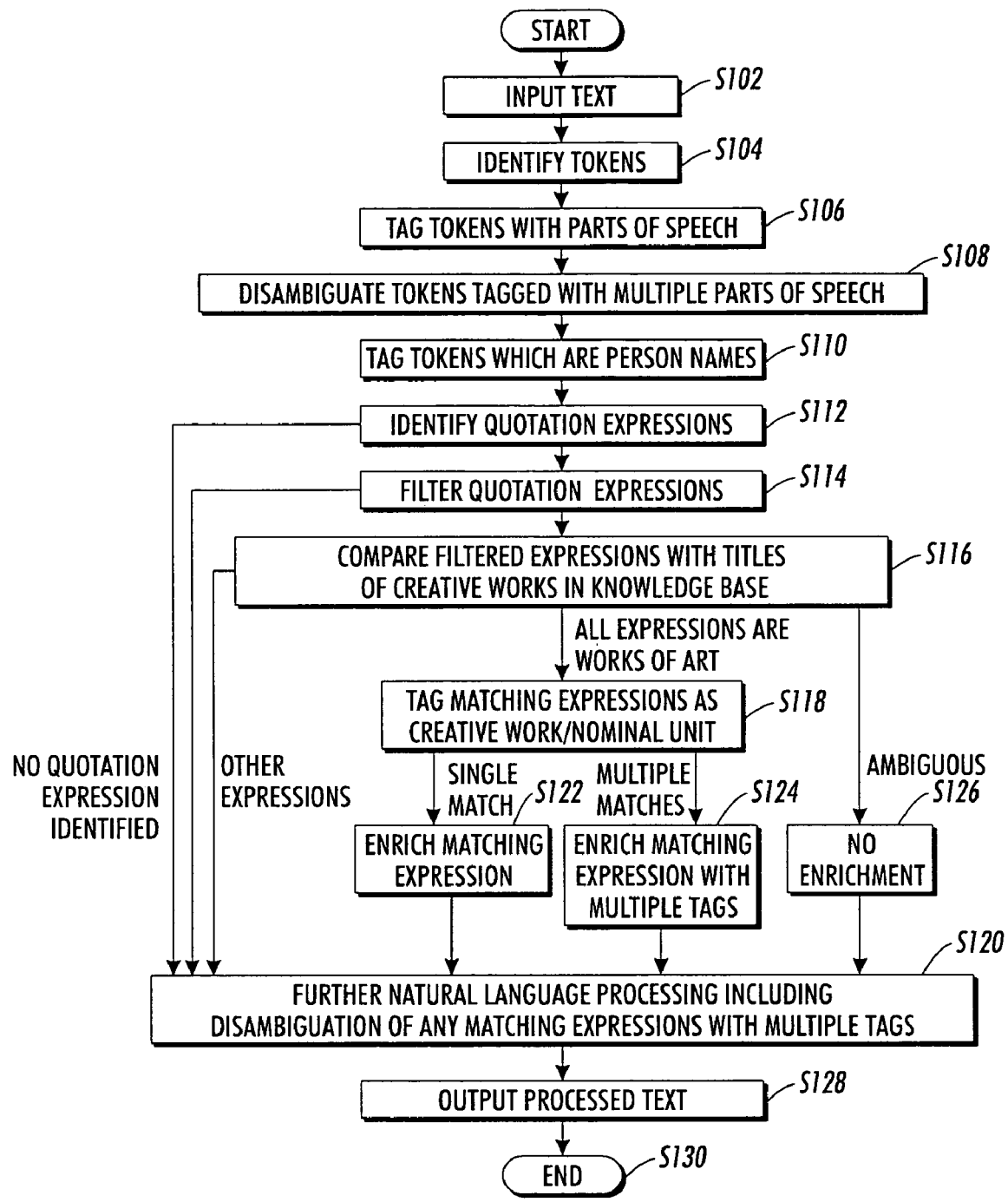
FIG. 2 is a flow diagram of a method for processing text in accordance with another aspect of the exemplary embodiment.

With reference to FIG. 2, an exemplary method for processing text including labeling text comprising titles of creative works, such as titles of works of art, is shown. It will be appreciated that the method may include fewer, more or different steps and that the steps need not proceed in the order illustrated. The method is described with reference to the exemplary parser shown in FIG. 1, although it is to be appreciated that other parsing systems may be employed. The method begins at step S100. At step S102, text to be processed is input to the parser 10 and stored in memory 40.

At step S104, the text is tokenized by the tokenizer module 16. In particular, the tokenizer 16 identifies quotation marks, and/or other emphasis, such as italics, underline, or bold emphasis of words within the text.

At step S106, parts of speech in the tokenized text are tagged by the morphological module 18. In particular, verbs of the type commonly associated with discourse are tagged as such. These are verbs that introduce direct speech in text, such as the verbs "say," "tell," "declare," "add," "warn," "announce," "respond," and the like (and all forms of these verbs). The verb may be placed in the sentence before or after the direct speech. These verbs also have specificities from the syntactic point of view (e.g., they accept subject-verb inversion). The lexicon 16 may associate each of these verbs, and other verbs commonly associated with transfer of information with a discourse feature.

Optionally, at step S108, ambiguous words may be disambiguated by the disambiguation module 22. The disambiguation step S108, in whole or in part, may be performed subsequent to the identification of creative works. Alternatively, the output of the disambiguation module can be modified once expressions relating to works of art have been identified.

At step S110, named entities recognized by the named entity module 24 may be tagged as such.

At step S112, quotation expressions are identified in the text by their linguistic form. In particular, the detection module 28 searches for one or more of:

1. An expression between double quotes.
2. An emphasized expression within the text such as an underlined expression, a capitalized expression, an italicized expression, a bold expression, an expression in which several words have their initial letter capitalized, or combination thereof (the detection module may ignore expressions which are set apart as in a heading).

Each of these types of quotation expressions may be tagged as a quotation expression. For example, given the sentence: Beginning with "Yesterday" (1965), he pioneered a modern form of art song, exemplified by "Eleanor Rigby" (1966), "Here There and Everywhere" (1966) and "She's Leaving Home" (1967) the detection module 28 may identify four quotation expressions. As will be appreciated, the quotation expressions identified by the quotation detection module 28 are not limited to work of art titles or other creative work titles since quotation is not restricted to titles and can be of different forms.

At step S114 the identified quotation expressions are filtered with the objective of filtering out all quoted expressions that do not correspond to work of art titles (or other creative work titles). To identify the quotation expressions to be removed from the group of candidate work of art titles, the filtering module 30 applies a set of rules. The rules are designed to identify statistically likely non work of art quotations, accepting that in some cases, actual work of art titles may be filtered out. Each type of non-work of art expression is associated with its own set of filtering rules.

Citations of direct speech: For example consider the sentence: A spokesman for British Columbia Forest said the company was "taken by surprise" by the announcement, but he added that "the market is firming." In this example, both quotation expressions correspond to citations of direct speech. To identify such quotation expressions, verbs introducing direct speech in English (and other languages) may be considered to constitute a finite set. The presence of one of these verbs, previously identified at step S106, in addition to a partial syntactic analysis of the sentence in which they are found, provides a simple method for discarding these citations from potential work of art titles.

For example, where quotation marks or other emphasis is identified in a sentence, the filtering module 30 checks if the sentence also contains one of the tagged verbs for introducing direct speech. The filtering module 30 may also identify the subject of the tagged verb (the person making the statement), and other information which may be used to confirm that the quotation expression is a citation of direct speech.

Neologisms or improper expressions: These quotation expressions can comprise words or phrases which have been recently coined and their emphasis in the text is used to indicate their recent provenance. Often, the words in such expressions are not stored in the lexicon. In these categories of quotation expressions, generally only one or few words are quoted. Furthermore, they are often nouns or noun phrases. In the case of neologisms that are not of a nominal nature, the words often contain morphologic clues that enable the correct part-of-speech of these words to be predicted, even if they are not present in a dictionary. Words such as brutalitarian which has a typical adjectival ending or bushism which have a typical noun ending are examples. The endings thus allow such words to be correctly tagged with the appropriate part of speech and in some cases to be filtered as non works of art. For example, the filtering module 30 may rely on the output of a neologism identifier or "guesser" 46, which may be combined with the morphological module. When a word is unknown in the lexicon 20 (as is generally the case for neologisms), the guesser 46 checks the endings of the unknown words. Words with a typical noun ending, such as "ism," are tagged as unknown noun. The filtering module may then filter out a quoted expression which includes one of these words as being not likely to be a work of art. Even if these expressions are not filtered in the filtering stage, their retention among the potential work of art titles is generally not a problem as they will be discarded in a subsequent step when no matches are found in the knowledge base among work of art titles. Accordingly, the filtering of quotation expressions containing neologisms may be omitted.

Quotation expressions which form a part of a person name: For example, in the case of William "Scotty" McLean, the quotation expression "Scotty" may be filtered out by first using the named entity recognition component 24 to identify William McLean as person name. A quotation expression within this recognized person name can then be filtered out.

Quotation expressions as nicknames: Nicknames are invariably nouns or noun phrases, and thus are generally tagged as such by the morphological module. See for example the following sentence where all quoted expressions correspond to nicknames: Mr. Agnelli is "the Lawyer." Mr. De Benedetti is "the Engineer." Mr. Gardini has been called "the Farmer" and "the Pharaoh," the latter for reasons that have vaguely to do with his financial ability, but neither epithet has stuck.

Since such quotation expressions are already tagged as nominal units, filtering of such expressions does not significantly improve the linguistic processing of a text. Accordingly, filtering of such quotation expressions may be considered as optional. In the exemplary sentence above, these quoted expressions may be retained as potential work of art titles. In most cases they will be discarded subsequently if the nickname does not correspond to an existent work of art. If the nickname does correspond to the name of a work of art, then this interpretation may be kept until a possible deeper linguistic processing where semantic incompatibility between work of art title and its context may be found. As nicknames are of nominal nature, deep linguistic processing can occur. For example in the above sentence, a deeper linguistic processing is able to detect that "the Lawyer" is an attribute of a person name. So a potential tagging of work of art for this string will be rejected as it is semantically inconsistent.

Once the candidate work of art titles are selected (i.e., those quotation expressions which have not yet been filtered out) the corresponding string is matched over the digital knowledge base 34 which contains information about works of art, such as an encyclopedia (step S116). In determining whether a match occurs, the processor may compare all of the words in the quotation expression to see if they match with the words in a stored title. The rules may require an exact match, i.e., that the quotation includes all of the words in the title—no fewer and no more, and in the same order as the title. Alternatively, the rules may permit a substantial match by permitting minor variations of the words or punctuation. For example the matching rule may ignore the absence of a determinator, such as The or A within the quoted expression which is the first word of the actual title since it is not uncommon for text to omit the first determinator or place it outside the quotes, as in the text string: Purchase the "*Great Gatsby*," by F. Scott Fitzgerald. The matching rule may also ignore punctuation, such as a comma or period, which occurs at the end of the quote, as in the previous text string, since it is common for such punctuation to be included within quotation marks, even though it may not appear in the title. For some applications, such as journal titles, where it is common to have a two part title split by a colon, the matching rule may accept a match of one or both parts of the title.

According to the result of the match against the knowledge source 34, the quoted expression may be identified as a work of art. If there is no match in the database 34, the quotation expression is removed from the candidate works of art expressions and parsed according to standard parsing rules along with any candidates previously filtered out at step S114 (step S120).

If all matches in the database refer to works of art, the method proceeds to step S118. If there is at least one match, the quoted expression is tagged as a nominal unit (step S118). If there is one and only one match to the quoted expression, additional information may optionally be extracted from the database and used for semantically enriching the results of the parsing process (step S122). For example, at step S122, the quoted expression may be tagged with the category and/or author of the matched work of art. Thereafter the parsing process may be continued (step S120), considering the entire quoted expression as a nominal unit (noun or noun phrase).

If at step S118 there are at least two matches, an optional step may include determining whether all matching work of art titles are listed in the same category or different categories (S124). Where more than one category is identified in the database, the quoted expression may be tagged with a generic tag, such as art title. The quoted expression may also be tagged with the categories identified. For example, "The Lord of the Rings" may be categorized as book as well as a movie. In this case, the quotation may be tagged as art_title: book, movie. Thereafter the parsing process may be continued, considering the entire quoted expression as a nominal unit (noun or noun phrase). In subsequent parsing (step S120), the different category types extracted can be further used together with the expression context to disambiguate the expression. For example, in the sentence: A musical version of some sections of this song can be heard in the movie "The Lord of the Rings" the left context "movie" can be used to disambiguate the category of the title as movie.

The database 34 may also include categories which are not works of art. For example, there are several matches pointing to different category types, not all referring to a work of art title, e.g., the quotation expression "Berlin" may refer to a music album, but also to a city, a music band, a car, etc. Where the candidate expression is too ambiguous according to the knowledge base (S126), the standard parsing process may continue without enrichment.

The subsequent parsing steps (S120) may depend on the needs of the particular application. For example, syntactical analysis can identify higher level constituents which are made up of more than one word or token. This is often referred to as chunking in which words are grouped around a head.

As step S128, the sentence or other text is output, together with annotations corresponding to some or all of the tags which have been appended to the sentence during parsing and optionally as enriched with information from the database. The method ends at step S130.

As will be appreciated, some of the steps in the method may be recursive. For example, the disambiguation step may be repeated after the identification of works of art titles.

The knowledge base may be used to enrich the sentence in which a work of art title is identified with additional information, such as information about the author. Alternatively or additionally, another database may be accessed to provide this information for enriching the text. The additional information may comprise one or more of text, images (e.g., reproductions of paintings, photographs), and audiovisual information, such as an extract of a movie to which the title refers.

The steps of the exemplary method may be executed automatically by the parser on the input text.

The output of the parser 10 can be used in various ways, depending upon the intended application of the natural language processing system. For example, in a grammar checker for use in conjunction with a word processor, the output of the parser 10 may be used directly—if all tokens are successfully tagged with unambiguous parts of speech, then the corresponding natural language text 12 is deemed grammatically correct; whereas, if some tokens are unable to be unambiguously tagged, these ambiguities are reported as possible grammatical problems, for example by underlining the ambiguous words in the displayed word processing text. In document content analyzers, language translators, and other applications in which the meaning of the text is relevant, the output of the parser 10 may undergo further processing. For example, further processing modules (not shown) may perform document content analysis, language translation, or so forth.

The method illustrated in FIG. 2 may be implemented in a computer program product that may be executed on a computer. The computer program product may be a computer-readable recording medium on which a control program is recorded, which encodes instructions for the exemplary method. The product may be a tangible medium, such as a disk, CD, hard drive, or the like, or may be a transmittable carrier wave in which the control program is embodied as a data signal, or a combination thereof. In the case of a plug in component, the product may encode those instructions which supplement those of a conventional parser, in particular, instructions for identifying candidate titles of creative works, filtering the identified candidates, comparing the candidates with titles in a knowledge base, and optionally annotating the matches as nominal units and/or enriching them with additional information.

The exemplary system and method provide the ability to guide and enrich the syntactic process by using external knowledge that goes far beyond pure lexical knowledge. It also provides the ability to categorize expressions using very fine-grained information provided by an encyclopedia or any rich source of information and also using syntactic context.

While the exemplary system focuses on identifying titles of works of art it is also contemplated that the system may be used to identify titles of other works, such as titles of scientific papers, titles of presentations, as long as the knowledge base provides the relevant information for identifying at least a portion of the titles of works which may be encountered in a text corpus to render the system useful.

The following non-limiting example demonstrates the effectiveness of the exemplary system.

EXAMPLE

A prototype parser was developed based on the Xerox Incremental Parser (XIP) described in the above-mentioned references. The parser allows the use of external knowledge sources during parsing process. XIP rules were developed to: select candidates by filtering out sentences containing indirect speech, by detecting verbs introducing indirect speech, and by filtering out quoted expressions contained in named entities.

The remaining quoted expressions are title candidates. XIP scripts were developed to extract the surface string (S_candidate) corresponding to these expressions. S_candidate strings are matched against a knowledge database. The database is a relatively limited extract of Wikipedia entries that was constructed semi automatically in XML format. However, for performance reasons, such a database may be stored in MySQL format and access via XIP Python capabilities. Each of the titles in the database is associated with one (or more) broad categories, such as movie, music, literature.

If an S_candidate string is matched and if it refers only to work of art titles (i.e. the category types attached to database entry refers to work of art), further rules are developed to: group the expression as nominal unit, and, where possible, to disambiguate the category type according to context. The type of art is categorized via unary dependencies.

As an example of output of the parser, for a sentence extracted from the Wall Street Journal:

Students read such works as Hermann Hesse's "Narcissus and Goldmund", F. Scott Fitzgerald's "The Great Gatsby" and Leo Tolstoy's "The Death of Ivan Ilyich" and share their personal dreams and failures with each other.

By parsing the document with the exemplary parser, the following information about the words in the text is identified:

MOD_POST(share,each other)
MOD_POST(works,Narcissus and Goldmund)
MOD_PRE(The Great Gatsby,F. Scott Fitzgerald)
MOD_PRE(The Death of Ivan Ilyich,Leo Tolstoy)
MOD_PRE(dreams,personal)
SUBJ_PRE(read,Students)
OBJ_POST(share,dreams)
OBJ_POST(share,failures)
COORD(and,failures)
COORD(and,dreams)
PERSON(F. Scott Fitzgerald)
PERSON(Leo Tolstoy)
PERSON(Ivan Ilyich)
PERSON(Hermann Hesse)
LITERATURE(Narcissus and Goldmund)
LITERATURE(The Great Gatsby)
LITERATURE(The Death of Ivan Ilyich)

The sentence may be annotated as follows:

---

0>TOP{SC{NP{Students} FV{read}} AP{such} FV{works} PP{as NP{Hermann Hesse's NOUN{Narcissus and Goldmund}}},
NP{NOUN{F. Scott Fitzgerald} 's NOUN{The Great Gatsby}} and NP{NOUN{Leo Tolstoy} 's NOUN{The Death of NOUN{Ivan Ilyich}}}
SC{and FV{share}} NP{their personal dreams} and NP{failures} PP{with NP{PRON{each other}}} .}

As can be seen, the exemplary process groups the work of art titles as nouns, thereby enabling a better syntactic analysis and also a semantic categorization.

Using the exemplary parsing system, even though a relatively limited knowledge base of work of art titles was employed, quite a significant benefit was observed. On a corpus of about 14000 sentences from the Wall Street Journal, 1800 quoted expressions were identified. Out of this group, about 1300 quoted expressions were filtered out as corresponding to direct speech. The remaining 500 expressions where analyzed with the matching system. Of these 47 should have been recognized as titles (based on human observation). The parser was able to spot correctly 45 of these titles, missing only 2 of them. This demonstrates that the system shows a high precision on that corpus.

It is to be expected that other sources of text may contain a greater number of work of art expressions than is generally the case for the Wall Street Journal, rendering the system particularly useful. For example, in extracts from journals about the cinema, the number of work of art titles is, as may be expected, much higher.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer comprising:
   a parser for parsing text comprising:
      a tokenizing module which divides the text into an ordered sequence of linguistic tokens,
      a morphological module for associating parts of speech with the linguistic tokens, the morphological module identifying verbs which are used to introduce direct speech,
      a detection module which applies rules for identifying expressions as candidate titles of works, each of the expressions comprising at least one of the linguistic tokens,
      a filtering module for filtering the candidate titles of works, the filtering module applying at least one rule which is formulated to exclude citations of direct speech from the candidate titles of works, the filtering module determining whether an expression identified by the detection module constitutes direct speech introduced by a verb identified by the morphological module as being one of the verbs which are used to introduce direct speech, and
      a comparison module for comparing remaining candidate titles of works with titles of works in an associated knowledge base and annotating the text to identify the candidate title as a nominative unit when a match with a title of a work is found in the associated knowledge base; and
   a digital processor for implementing the parser.

2. The computer of claim 1, wherein the parser further comprises an enrichment module which enriches text, for which a match is found, with semantic information derived from information in the knowledge base which is liked to a title of a work.

3. The computer of claim 1, wherein the parser further comprises a named entity module for identifying person names in the text and wherein the filtering module filters out candidate titles of works which are within an identified person name.

4. A natural language processing system comprising:
   the computer of claim 1; and
   a knowledge base which stores titles of works.

5. The natural language processing system of claim 4, wherein the knowledge base links each title of a work to information which includes at least one of a creator of the work and a category of the work selected from a set of categories.

6. The natural language processing system of claim 4, wherein the parser further comprises an enrichment module which enriches the text with information which includes at least one of the creator of the work and the category of the work selected from a set of categories.

7. A method for natural language processing of input text comprising:
   processing the text to identify a group of candidate titles of works;
   identifying verbs which are used to introduce direct speech;
   filtering the group of candidate titles of works, including applying at least one rule which is formulated to remove candidate titles of works which are citations of direct speech from the group of candidate titles of works, the filtering comprising filtering out expressions linked to a verb identified as being one of the verbs which are used to introduce direct speech;
   comparing remaining candidate titles of works with a knowledge base which identifies titles of works;
   for a candidate title of a work which matches a title of a work in the knowledge base, annotating the text to identify the candidate title of a work as a nominative unit; and
   wherein the filtering, processing, comparing, and annotating are all implemented by a digital processor.

8. The method of claim 7, wherein the titles of works comprise titles of works of art.

9. The method of claim 7, further comprising:
   retrieving information from a knowledge base, the information comprising at least one of a category of the matching title of the work and a creator of the matching title of the work; and
   enriching the text with information derived from the retrieved information.

10. The method of claim 7, wherein the nominative unit comprises at least one of a noun and a noun phrase.

11. The method of claim 7, wherein the filtering further applies a rule to remove at least one of neologisms, quotations included in person names, and nicknames.

12. The method of claim 11, further comprising identifying person names in the text and wherein the filtering comprises filtering out candidate titles of works which are within an identified person name.

13. The method of claim 7, wherein the processing includes dividing the text into an ordered sequence of tokens, associating parts of speech with the tokens, and identifying any expressions, each comprising at least one of the tokens, which are distinguished from adjacent tokens in a manner used to identify titles of works.

14. The method of claim 13, wherein the processing includes identifying expressions which are bounded by quotation marks.

15. A storage medium comprising instructions which when executed by the digital processor implement the method of claim 7.

16. A tangible storage medium comprising instructions which when executed by a digital processor implement natural language processing of a text input comprising:
- processing the text to identify candidate titles of works;
- identifying verbs which are used to introduce direct speech;
- filtering the candidate titles of works to remove candidate titles of works that are determined to be citations of direct speech from the candidate titles of works, the filtering comprising filtering out expressions linked to a verb identified as being one of the verbs which are used to introduce direct speech;
- comparing candidate titles of works with a knowledge base which identifies titles of works; and
- annotating text which includes a candidate title of a work for which a match is found in the knowledge base.

17. The storage medium of claim 16, wherein the instructions for annotating the text comprise instructions for identifying the candidate title of the work as a nominative unit.

18. A method for natural language processing of input text comprising:
- processing the text to identify candidate titles of works;
- filtering the candidate titles of works, including applying at least one rule which is formulated to remove citations of direct speech from the candidate titles of works including identifying verbs which are used to introduce direct speech and filtering candidate titles as constituting direct speech based at least in part on whether the candidate title is introduced by an identified verb which is used to introduce direct speech;
- comparing remaining candidate titles of works with a knowledge base which identifies titles of works;
- for a candidate title of a work which matches a title of a work in the knowledge base, annotating the text to identify the candidate title of a work as being a nominative unit; and
- wherein the filtering, processing, comparing, and annotating are all implemented by a digital processor.

* * * * *